United States Patent
Karaki et al.

(10) Patent No.: US 9,223,545 B2
(45) Date of Patent: Dec. 29, 2015

(54) MODIFIED FIXED-POINT ALGORITHM FOR IMPLEMENTING INFRARED SENSOR RADIATION EQUATION

(71) Applicant: Texas Instruments Incorporated, Dallas, TX (US)

(72) Inventors: Habib Sami Karaki, Tucson, AZ (US); Ankit Khanna, Tucson, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 314 days.

(21) Appl. No.: 13/855,555

(22) Filed: Apr. 2, 2013

(65) Prior Publication Data

US 2014/0089362 A1    Mar. 27, 2014

Related U.S. Application Data

(60) Provisional application No. 61/704,977, filed on Sep. 24, 2012.

(51) Int. Cl.
    *G06F 17/11*    (2006.01)
    *G06F 7/483*    (2006.01)
    *G01J 5/10*    (2006.01)

(52) U.S. Cl.
    CPC . *G06F 7/483* (2013.01); *G01J 5/10* (2013.01); *G06F 17/11* (2013.01)

(58) Field of Classification Search
None
See application file for complete search history.

(56) References Cited

U.S. PATENT DOCUMENTS

| 6,369,386 | B1* | 4/2002 | Charlier et al. | 250/338.1 |
| 2007/0183475 | A1* | 8/2007 | Hutcherson | 374/120 |
| 2011/0140899 | A1* | 6/2011 | Flandin | 340/584 |
| 2014/0089362 | A1* | 3/2014 | Karaki et al. | 708/209 |

* cited by examiner

*Primary Examiner* — David H Malzahn
(74) *Attorney, Agent, or Firm* — Gregory J. Albin; Frank D. Cimino

(57) ABSTRACT

A system including an integrated circuit chip also includes a microcontroller in the chip and an algorithm for execution by the microcontroller. The algorithm includes addition, subtraction, and multiplication operators (e.g. 25,15,20) and shift-left and shift-right operators (e.g., 48,21) configured for solving particular equations (Eqns. 1-4). Input numbers are within particular ranges to allow the shift operators to shift binary bits so each number so it fits within a register of a particular width. An IR sensor (4) may convert IR radiation (3) to produce a voltage ($V_{obj}$) representing the temperature ($T_{obj}$) of an IR emitting object (2). The algorithm (100) operates in conjunction with the microcontroller (7) to convert the voltage ($V_{obj}$) into a value representing the temperature ($T_{obj}$) of the remote object (2) without keeping track of decimal points and resolution of the numbers.

20 Claims, 8 Drawing Sheets

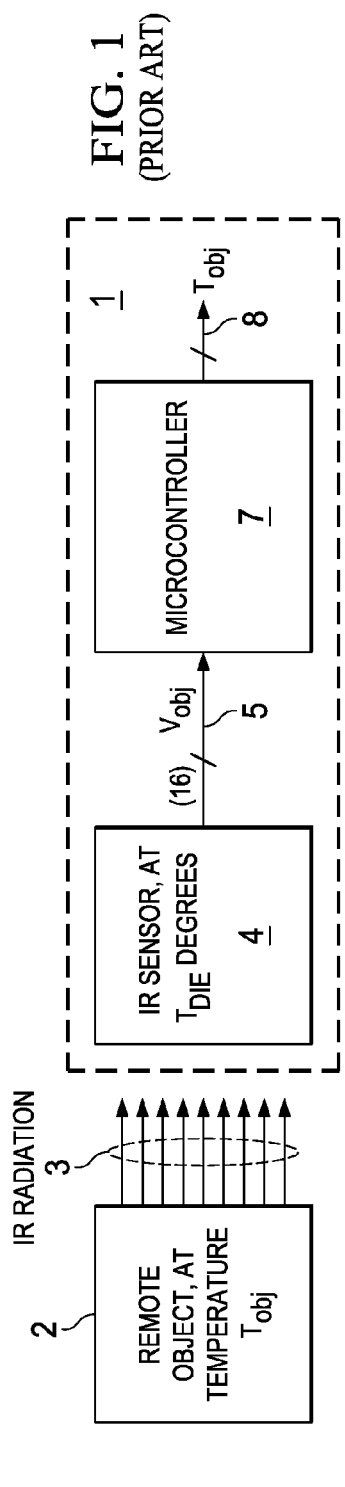
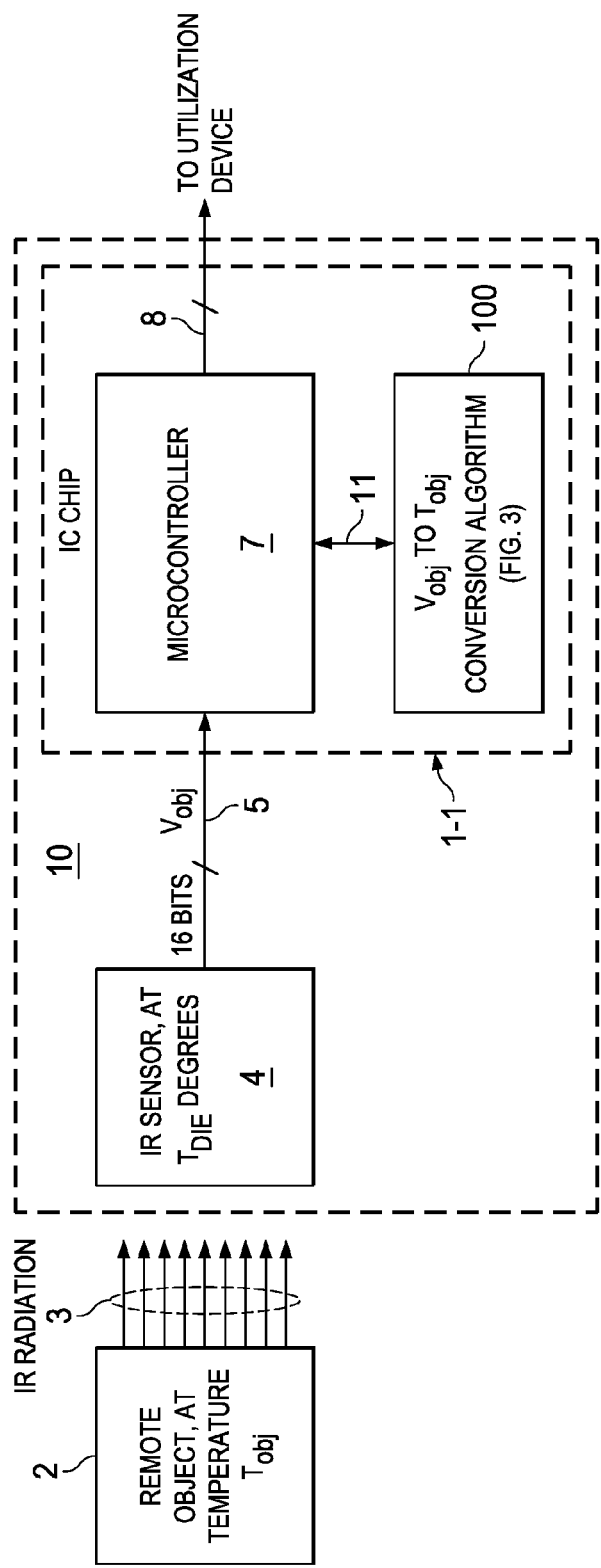

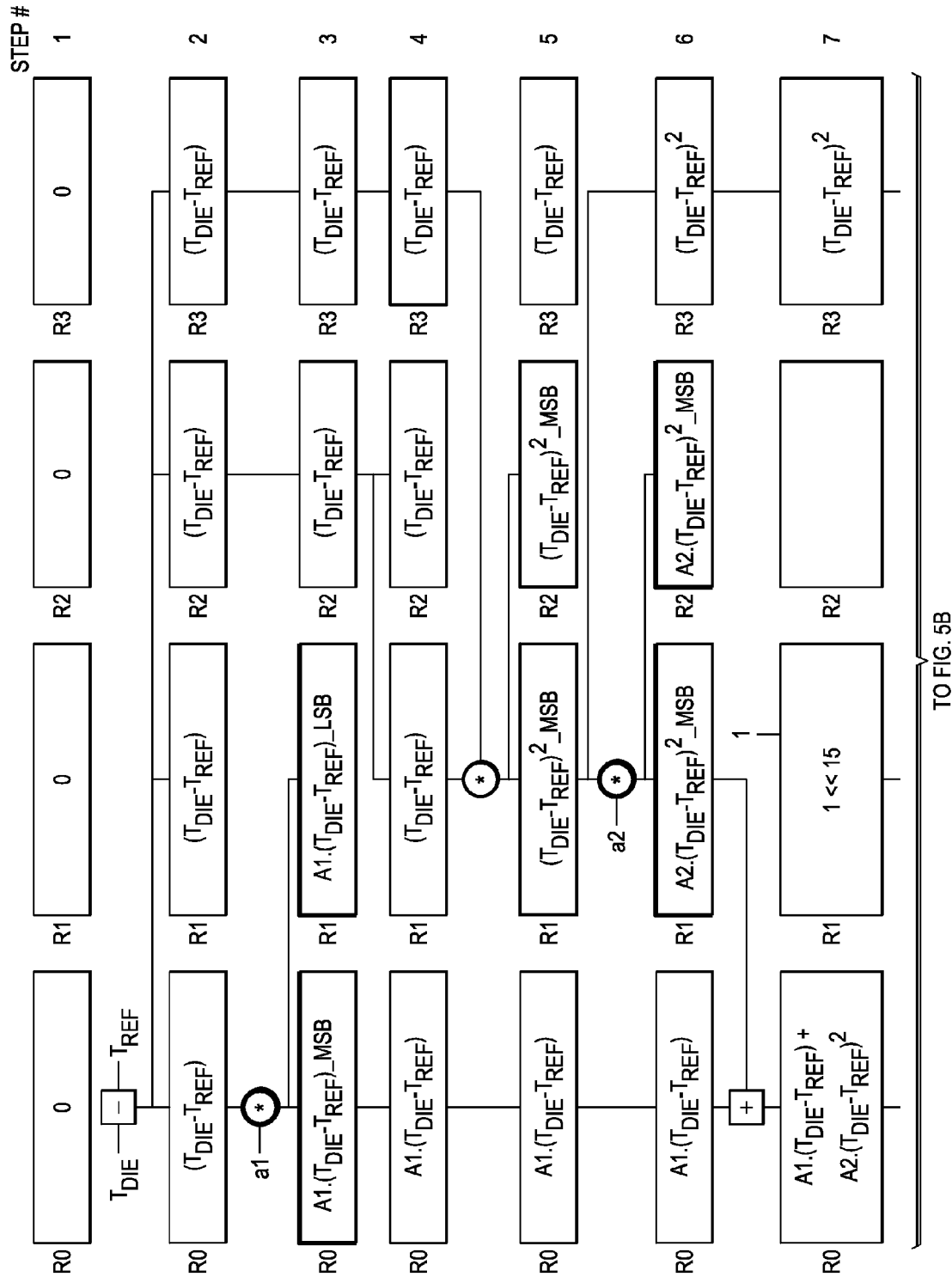

MODIFIED FIXED-POINT ALGORITHM FOR IMPLEMENTING INFRARED SENSOR RADIATION EQUATION

CROSS REFERENCE TO RELATED APPLICATION

This application claims the benefit of prior U.S. provisional application Ser. No. 61/704,977 filed Sep. 24, 2012, entitled "Fixed-Point Algorithm to Implement Infrared Sensor Radiation Equation", by Habib Sami Karaki and Ankit Khanna, and incorporated herein by reference.

BACKGROUND OF THE INVENTION

The present invention relates generally to infrared sensors that may be used for contactless temperature measurement of a remote object, and more particularly to an algorithm that efficiently and inexpensively converts infrared radiation received from the remote object to the temperature of the object without using a floating point microcontroller.

In "Prior Art" FIG. 1, a remote object 2 which has a surface temperature $T_{obj}$ emits infrared radiation (IR) 3. An IR system 1 includes a conventional IR sensor 4 which generates a digital representation $V_{obj}$ of the temperature of remote object 2 on a bus 5. $V_{obj}$ is provided as an input to a microcontroller or processor 7. Microcontroller 7 executes a conventional conversion algorithm or a conventional software floating point conversion algorithm represented by various equations (that have been written by others) to represent the conversion of the voltage $V_{obj}$ generated by IR sensor 4 to the temperature $T_{obj}$ of the remote object 2. In some cases, the microcontroller has been combined into the same package with the IR sensor, IR sensor 4 and microcontroller 7 usually are on separate chips that are mounted in the same package or on the same print circuit board.

The conventional way to implement a mathematics algorithm for solving the conversion equations in software has been to express all numbers as binary coded decimal numbers and have the computer software take care of the complexity. However, if the conversion algorithm needs to be implemented in an integrated circuit, that approach would require a great deal of additional chip area and therefore would substantially increase its cost.

The floating-point numbers that computers utilize typically are "standardized", for example by using 32-bit integers each including 24 bits representing the numerical value or "mantissa" of the number and 7 bits as the value of the exponent of the 24-bit numerical value; the one remaining bit is used for the algebraic sign of the 32-bit integer. Hardware and software floating-point arithmetic operates to keep track of the exponents of the 32-bit words as they are processed by various logical operators which perform addition, subtraction, multiplication, and division. Often the floating-point arithmetic capability is implemented in hardware so the microcontroller can execute the mathematical operations of a conversion algorithm very rapidly. Alternatively, if the floating point processing capability is implemented in software instead of hardware, the microcontroller assembly language is used for keeping track of the above-mentioned exponents of the 32-bit words as they undergo the various addition, subtraction, multiplication, and division operations. However, this approach results in much slower execution of the conversion algorithm and a large amount of programming code, which requires a large amount of memory.

A floating point implementation of the conversion algorithm may be possible/practical. However, a hardware implementation of a floating point math engine is costly in terms of die area, die cost, power consumption, and engineering design time, and may not be an option for a very low cost infrared sensor having a small die or chip size. In this case, a few alternatives may be considered. One alternative is to use floating point emulation, wherein a C/C++ compiler is utilized which can emulate floating point arithmetic in software that is executed in the microcontroller used to execute the conversion algorithm. Although floating point emulation has the advantages of providing very precise results and making it easy to modify the IR-to-temperature conversion algorithm if necessary, the amount of programming code is relatively large and the algorithm execution times are relatively slow. If a microcontroller which includes a hardware-implemented floating-point arithmetic capability is a justifiable option during the design phase and is used to perform the conversion of the IR sensor output to a digital representation of the temperature of the object being scanned, then use of a floating-point implementation of the conversion algorithm is usually preferable, because it results in an accurate conversion from infrared radiation intensity to the object temperature without the need for additional software code or execution time.

In a traditional fixed point implementation, all numbers are represented by integers and the decimal point is fixed in place. For example, a 32 bit register can be used to represent a number wherein the upper 16 bits represent whole numbers and the lower 16 bits represent fractional numbers. In such an arrangement, addition and subtraction are direct, while multiplication and division require the same frequent bit shifting to keep the decimal point "fixed" in the 16th bit position. This traditional implementation is not suitable for a typical IR conversion equation algorithm because of the needed range and accuracy. There are cases in which a very large number is multiplied by a very small number to produce a product in the middle range and other cases wherein two very small numbers are divided one into the other to produce a very large number. In short, there are just not enough bits in a 32 bit register to keep acceptable accuracy while nevertheless still using a fixed point implementation.

Whenever hardware or hard-wired fixed point mathematics computations are performed there is always a likelihood that the digital words being generated during execution of the algorithm will have more bits than the bit width (32 bits in this example) of the available registers. In floating-point mathematics, the exponent is accordingly modified and the out-of-range numerically significant bit portion of the out-of-range digital word is shifted so as to reduce the number of bits such that the entire digital word fits into the available 32-bit registers.

Thus, there is an unmet need for a IR-to-object temperature conversion algorithm which provides adequate accuracy of the measured object temperature for many applications without using the floating point algorithms that have been available in the prior art.

There also is an unmet need for a fast, low-cost IR-to-object fixed-point temperature conversion algorithm which provides adequate accuracy of the measured object temperature for many applications.

There also is an unmet need for a low-cost integrated circuit IR-to-object temperature conversion algorithm which provides adequate accuracy and very fast conversion of the power of infrared radiation to the temperature of the imaging object without substantially increasing the amount of required integrated circuit chip area.

SUMMARY OF THE INVENTION

It is an object of the invention to provide a IR-to-object temperature conversion algorithm which provides adequate accuracy of the measured object temperature for many applications, without using floating point algorithms that have been available in the prior art.

It is another object of the invention to provide a fast, low-cost IR-to-object fixed-point temperature conversion algorithm which provides adequate accuracy of the measured object temperature for many applications.

It is another object of the invention to provide a low-cost integrated circuit IR-to-object temperature conversion algorithm which provides adequate accuracy and very fast conversion of the power of infrared radiation to object temperature without substantially increasing the amount of required integrated circuit chip area.

Briefly described, and in accordance with one embodiment, the present invention provides a system (10) including an integrated circuit chip (1-1) and also includes a microcontroller (7) in the chip and also includes an algorithm (100) in the chip for execution by the microcontroller (7). The algorithm includes addition, subtraction, and multiplication operators (e.g., 25,15,20) and shift-left and shift-right operators (e.g., 48,21) arranged to solve particular equations (Eqns. 1-4). Input numbers are limited to being within particular ranges to allow the shift operators to shift binary bits so each number so it fits within a register of a particular width. An IR sensor (4) may convert IR radiation (3) to produce a voltage ($V_{obj}$) representing the temperature ($T_{obj}$) of an IR-emitting object (2). The algorithm (100) operates in conjunction with the microcontroller (7) to convert the voltage ($V_{obj}$) into a value representing the temperature ($T_{obj}$) of the remote object (2) without keeping track of decimal points and resolution of the numbers.

In one embodiment, the invention provides a system (10) including an integrated circuit chip (1-1), a microcontroller (7) in the integrated circuit chip (1-1), and an algorithm (100) coupled to the microcontroller (7). The algorithm (100) includes a plurality of addition operators (e.g., 25,29,38), a plurality of subtraction operators (e.g., 15,50,78), a plurality of multiplication operators (e.g., 20,23,17,39), a plurality of shift-left operators (e.g., 48,62,76), and a plurality of shift-right operators (e.g., 21,26,30,37) configured so as to solve a plurality of equations (Eqns. 1-4), wherein for a plurality of input numbers each having a predetermined value within a predetermined range, respectively, the various shift-left and shift-right operators shift numbers are generated according to the algorithm (100) so as to automatically establish the resolution of each number so it fits within a register of a predetermined number of bits.

In one embodiment, the system (10) is configured to convert IR (infrared) radiation (3) emitted by a remote object (2) to a value representative of a temperature ($T_{obj}$) of the remote object (2), and includes an IR sensor (4) receiving some of the emitted IR radiation (3) for producing a voltage ($V_{obj}$) representing the temperature ($T_{obj}$) of the remote object (2), wherein the algorithm (100) operates in conjunction with the microcontroller (7) to convert the voltage ($V_{obj}$) into a value representing the temperature ($T_{obj}$) of the remote object (2).

In one embodiment, operation of the IR sensor (4) is represented by a plurality of equations including $$S = S_0(1 + a_1(T_{DIE} - T_{REF}) + a_2(T_{DIE} - T_{REF})^2), \quad \text{Equation (1)}$$

$$V_{OS} = b_0 + b_1(T_{DIE} - T_{REF}) + b_2(T_{DIE} - T_{REF})^2, \quad \text{Equation (2)}$$

$$f(V_{obj}) = (V_{obj} - V_{OS}) + c_2(V_{obj} - V_{OS})^2, \text{ and} \quad \text{Equation (3)}$$

$$T_{obj}^4 = \sqrt{T_{die}^4 + \left(\frac{f(V_{obj})}{S}\right)}, \quad \text{Equation (4)}$$

where S represents sensor response relative to the fourth power of the temperature $T_{DIE}$ of the IR sensor (4), $S_0$ represents a linear portion of the sensor response, $a_1$ and $a_2$ represent first and second order dependence, respectively, on the temperature $T_{DIE}$ of the IR sensor (4), $T_{REF}$ represents 298.15 degrees Kelvin, $c_2$ represents a second order non-ideality in the voltage response of the sensor to IR radiation, and $V_{OS}$ represents voltage offset of the IR sensor (4), where $b_0$, $b_1$ and $b_2$ represent the constant, first order, and second order dependencies, respectively, of the offset voltage $V_{OS}$ on the sensor temperature $T_{DIE}$. In one embodiment, the predetermined number of register bits is 32. In one embodiment, the IR sensor (4) is included in the integrated circuit chip (1-1). In one embodiment, the values of $a_1$, $a_2$, $b_0$, $b_1$, $b_2$, $c_2$, $S_0$, and $T_{REF}$ for Equations 1-4 are $a_1 = -1.75 \times 10^{-5}$, $a_2 = -1.678 \times 10^{-5}$, $b_0 = -3.0 \times 10^{-5}$, $b_1 = -6.0 \times 10^{-7}$, $b_2 = 0.25 \times 10^{-9}$, $c_2 = -13.4$, $S_0 = 6.8 \times 10^{-14}$, and $T_{REF} = 298.15$ degrees Kelvin. In one embodiment, (100) is executed using only four 32-bit registers.

In one embodiment, the algorithm (100) operates to convert the temperature $T_{DIE}$ of the integrated circuit from degrees centigrade to degrees Kelvin before determining the value of the temperature in degrees Kelvin of the remote object (2) according to Equation (4), and also operates to convert the temperature in degrees Kelvin of the remote object (2) according to Equation (4) to degrees centigrade to produce the temperature ($T_{obj}$) of the remote object (2) in degrees centigrade.

In the described embodiment, some numbers generated in the algorithm are expressed in scientific notation and others are expressed only as binary numbers. The algorithm (100) performs a fourth order square root function for Equation (4) by performing a binary search algorithm to generate a number representing $f(V_{obj})/S$ in Equation 4.

In one embodiment, the system includes a digital filter defined in accordance with the expression $$x_{Filtered}[n] = a \times (x[n] + x[n-1]) + b \times (x_{Filtered}[n-1])$$

where $2a+b=1$, for reducing output noise of $T_{obj}$. In one embodiment, the system includes a digital filter defined in accordance with the expression $$x_{Filtered}[n] = a \times (x[n] + x[n-1]) + b \times (x_{Filtered}[n-1])$$

where $2a+b=1$, for use in transient correction of $T_{obj}$, and where a and b are coefficients that relate to the pole of the digital filter.

In the described embodiment, the algorithm (100) performs the shifting to automatically establish the resolutions without keeping track of decimal points or associated resolutions or exponents of the numbers.

In one embodiment, the invention provides a method of operating a system (10) including an integrated circuit chip (1-1), the method including providing a microcontroller (7) in the integrated circuit chip (1-1), coupling the microcontroller (7) to execute an algorithm (100), and providing a plurality of addition operators (e.g., 25,29,38), a plurality of subtraction operators (e.g. 15,50,78), a plurality of multiplication operators (e.g., 20,23,17,39), a plurality of shift-left operators (e.g., 48,62,76), and a plurality of shift-right operators (e.g., 21,26, 30,37) in the microcontroller (7); executing the algorithm (100) by means of the microcontroller (7) to solve a plurality of equations (Eqns. 1-4) and operating the various shift-left operators (e.g., 48,62,76) and the various shift-right operators (e.g., 21,26,30,37,41,46,54,51A,58,76) so as to automatically establish the resolution of each number generated in the algorithm (100) to cause the number to fit within a register having a width of a predetermined number of bits without keeping track of decimal points or associated resolutions or exponents of the numbers, wherein the microcontroller (7) and the algorithm (100) are particularly configured to solve the particular group of equations (Eqns. 1-4) for the input numbers and their associated predetermined ranges.

In one embodiment, the method includes providing an IR sensor (4) receiving emitted IR radiation (3) for producing a voltage ($V_{obj}$) representing the temperature ($T_{obj}$) of the remote object (2), wherein step (c) includes operating the algorithm (100) in conjunction with the microcontroller (7) to convert the voltage ($V_{obj}$) into a value representing the temperature ($T_{obj}$) of the remote object (2).

In one embodiment, the IR sensor (4) is operated in accordance with equations including $$S = S_0(1 + a_1(T_{DIE} - T_{REF}) + a2(T_{DIE} - T_{REF})^2), \quad \text{Equation (1)}$$

$$V_{OS} = b_0 + b_1(T_{DIE} - T_{REF}) + b_2(T_{DIE} - T_{REF})^2, \quad \text{Equation (2)}$$

$$f(V_{obj}) = (V_{obj} - V_{OS}) + c_2(V_{obj} - V_{OS})^2, \text{ and} \quad \text{Equation (3)}$$

$$T_{obj}^4 = \sqrt{T_{die}^4 + \left(\frac{f(V_{obj})}{S}\right)}, \quad \text{Equation (4)}$$

where S represents sensor response relative to the fourth power of the temperature $T_{DIE}$ of the IR sensor (4), $S_0$ represents a linear portion of the sensor response, $a_1$ and $a_2$ represent first and second order dependence, respectively, on the temperature $T_{DIE}$ of the IR sensor (4), $T_{REF}$ represents 298.15 degrees Kelvin, $c_2$ represents a second order non-ideality in the voltage response of the sensor to IR radiation, and $V_{OS}$ represents voltage offset of the IR sensor (4), where $b_0$, $b_1$ and $b_2$ represent the constant, first order and second order dependencies, respectively, of the offset voltage $V_{OS}$ on the sensor temperature $T_{DIE}$.

In one embodiment, the method includes operating the algorithm (100) includes using only four 32-bit registers in the microcontroller (7).

In one embodiment, the method includes performing a fourth order square root function for Equation (4) by performing a binary search algorithm to generate a number representing the fourth order square root function. (However, the expression $f(V_{obj})/S$ in Equation 4 could be directly calculated using a standard decision algorithm used in most microcontrollers.)

In one embodiment the invention provides a system (10) for converting IR (infrared) radiation (3) emitted by a remote object (2) to a value representative of a temperature ($T_{obj}$) of the remote object (2), including an IR sensor (4) receiving some of the emitted IR radiation (3) for producing a voltage ($V_{obj}$) representing the temperature ($T_{obj}$) of the remote object (2); and means (7,100) for converting the voltage ($V_{obj}$) to a value representing the temperature ($T_{obj}$) of the remote object (2), including a plurality of addition operators (e.g., 25,29,38), a plurality of subtraction operators (e.g., 15,50,78), a plurality of multiplication operators (e.g., 20,23, 17), a plurality of shift-left operators (e.g., 48,62,76), and a plurality of shift-right operators (e.g. 21,26,30) configured so as to solve a plurality of equations (Eqns. 1-4), and wherein for a plurality of input numbers each having a predetermined value within a predetermined range, respectively, the various shift-left and shift-right operators shift various numbers generated in the algorithm (100) so as to automatically establish the resolution of each number generated in the algorithm (100) so the number fits within a register (R0,1,2, or 3) having a width of a predetermined number of bits.

BRIEF DESCRIPTION OF THE DRAWINGS

FIG. 1 is a block diagram of a typical IR sensor system for measuring the temperature of a remote object.

FIG. 2 is a block diagram of an IR sensor system including the IR-to-$T_{obj}$ conversion algorithm and logic circuitry represented in FIGS. 3A and 3B.

FIGS. 5A through 5D ("FIG. 5") illustrate a diagram of an implementation of the algorithm and logic circuitry of FIG. 3 using four 32-bit registers.

DETAILED DESCRIPTION OF THE PREFERRED EMBODIMENTS

Figure 3A:
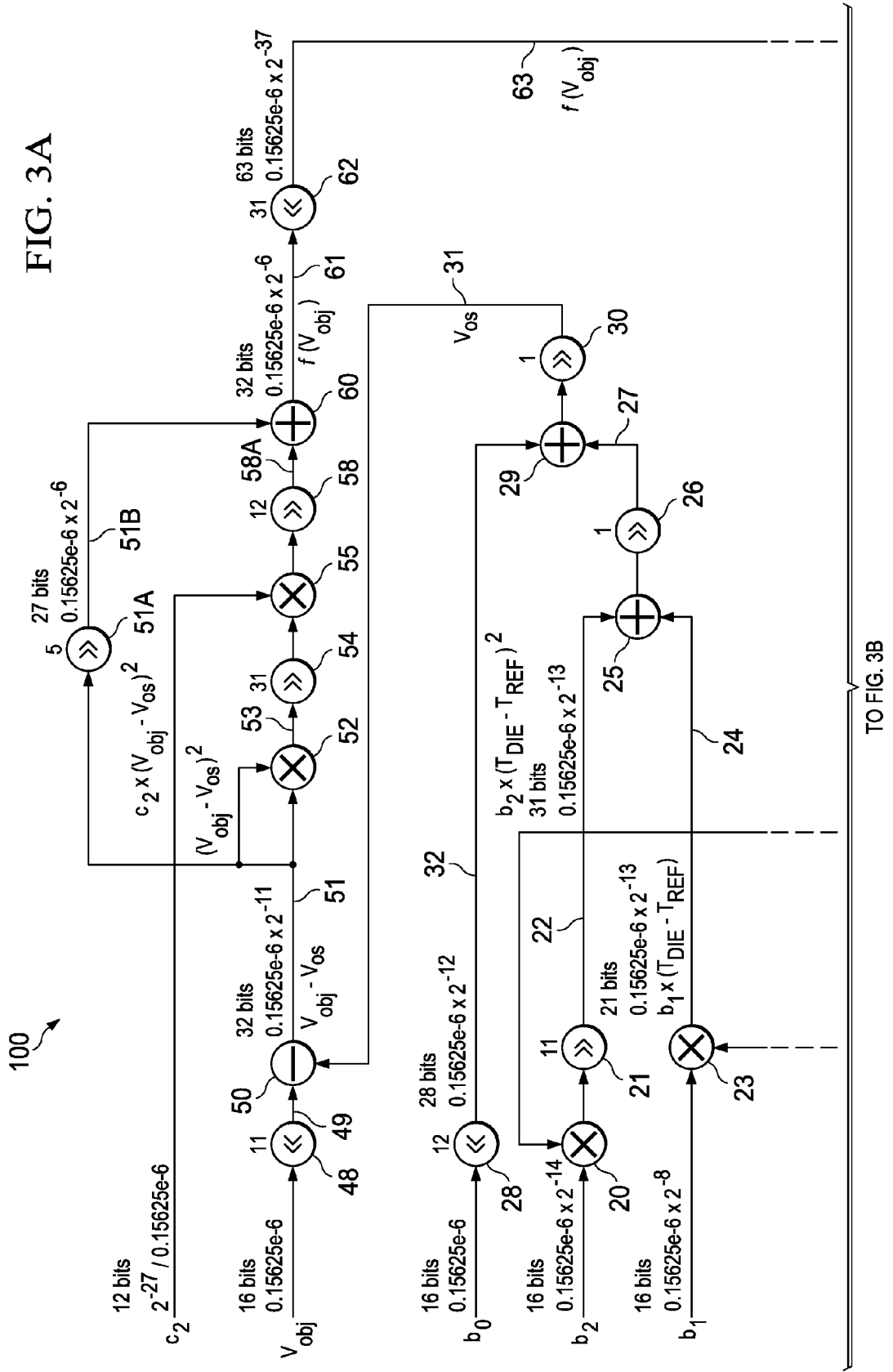
FIGS. 3A and 3B ("FIG. 3") illustrate a detailed flow diagram that represents the algorithm and logic circuitry in FIG. 2 for implementing conversion of a voltage representing the power in Watts of received IR radiation to an accurate representation of the temperature of a remote object emitting the IR radiation.

A contactless infrared (IR) sensor integrated circuit includes an IR sensor and a microcontroller which operates to convert a voltage that represents impinging IR radiation power to a digital word or number that represents the temperature of a remote object emitting the IR radiation. (The term "remote object" as used herein simply means that the IR sensor does not physically contact the surface of the object emitting the IR radiation.) The microcontroller executes a "virtual resolution" IR conversion algorithm that is executed by means of hard-wired integrated circuit logic circuitry, such as logic circuitry in a microcontroller, which precisely corresponds to the conversion algorithm and maintains "virtual resolution" of digital values expressed in scientific notation (integer value multiplied by a base number raised to an exponential power) without additional circuitry or software for keeping track of the exponents. The implementation of the conversion algorithm is optimized to provide both increased speed in performing or executing the conversion algorithm and reduced memory requirements within the temperature range of the IR sensor.

In FIG. 2, a remote object 2 which has a surface temperature $T_{obj}$ emits IR radiation 3. An IR sensor system 10 includes an IR sensor 4 which generates a digital representation $V_{obj}$ of the temperature of remote object 2 on a bus 5. $V_{obj}$ provided as an input to a microcontroller or processor 7 which may be included in an integrated circuit chip 1-1. Microcontroller 7 operates in conjunction with above mentioned $V_{obj}$-to-$T_{obj}$ conversion algorithm 100 which solves the Equations 1-4 set forth below. It should be noted that conversion algorithm 100 may be included on the same chip 1-1 with microcontroller 7, or algorithm 100 may be stored in a separate memory module and then loaded into microcontroller 7 during start-up operation.

In some cases IR sensor 4, microcontroller 7, and $V_{obj}$-to-$T_{obj}$ conversion algorithm 100 may be implemented together on an integrated circuit chip. Microcontroller 7 operates to present $T_{obj}$ in degrees centigrade as a digital number which can be used by a display or other utilization device.

The following equations represent the conversion of the voltage $V_{obj}$ to the temperature $T_{obj}$ of the remote object, where $V_{obj}$ is the voltage generated by the IR sensor in response to impinging IR radiation received by the IR sensor from the remote object:

$$S = S_0(1 + a_1(T_{DIE} - T_{REF}) + a2(T_{DIE} - T_{REF})^2), \quad \text{Eqn. (1)}$$

$$V_{OS} = b_0 + b_1(T_{DIE} - T_{REF}) + b_2(T_{DIE} - T_{REF})^2, \quad \text{Eqn. (2)}$$

$$f(V_{obj}) = (V_{obj} - V_{OS}) + c_2(V_{obj} - V_{OS})^2, \text{ and} \quad \text{Eqn. (3)}$$

$$T_{obj}^4 = \sqrt{T_{die}^4 + \left(\frac{f(V_{obj})}{S}\right)}, \quad \text{Eqn. (4)}$$

where ideal radiation heat transfer is proportional to the object temperature to the fourth power, and where S represents the sensor response or gain relative to the fourth power of the object temperature $T_{obj}$. $S_0$ represents the linear portion of the sensor response, and $a_1$ and $a_2$ represent first and second order dependence $T_{DIE}$, which represents the temperature of IR sensor 4 in FIG. 2, and $T_{REF}$ represents 298.15° Kelvin or 25° C. $V_{OS}$ represents a voltage offset of the response of IR sensor 4 where $b_0$, $b_1$ and $b_2$ respectively represent the constant, first order and second order dependence of that offset on the sensor temperature $T_{DIE}$. The response $V_{obj}$ of sensor 4 response is based on the Seebeck effect and is almost linear with respect to ideal infrared radiation but nevertheless includes a small second order effect which is modeled with $f(V_{obj})$ in Equation 3 through the coefficient $c_2$.

Figure 3B:
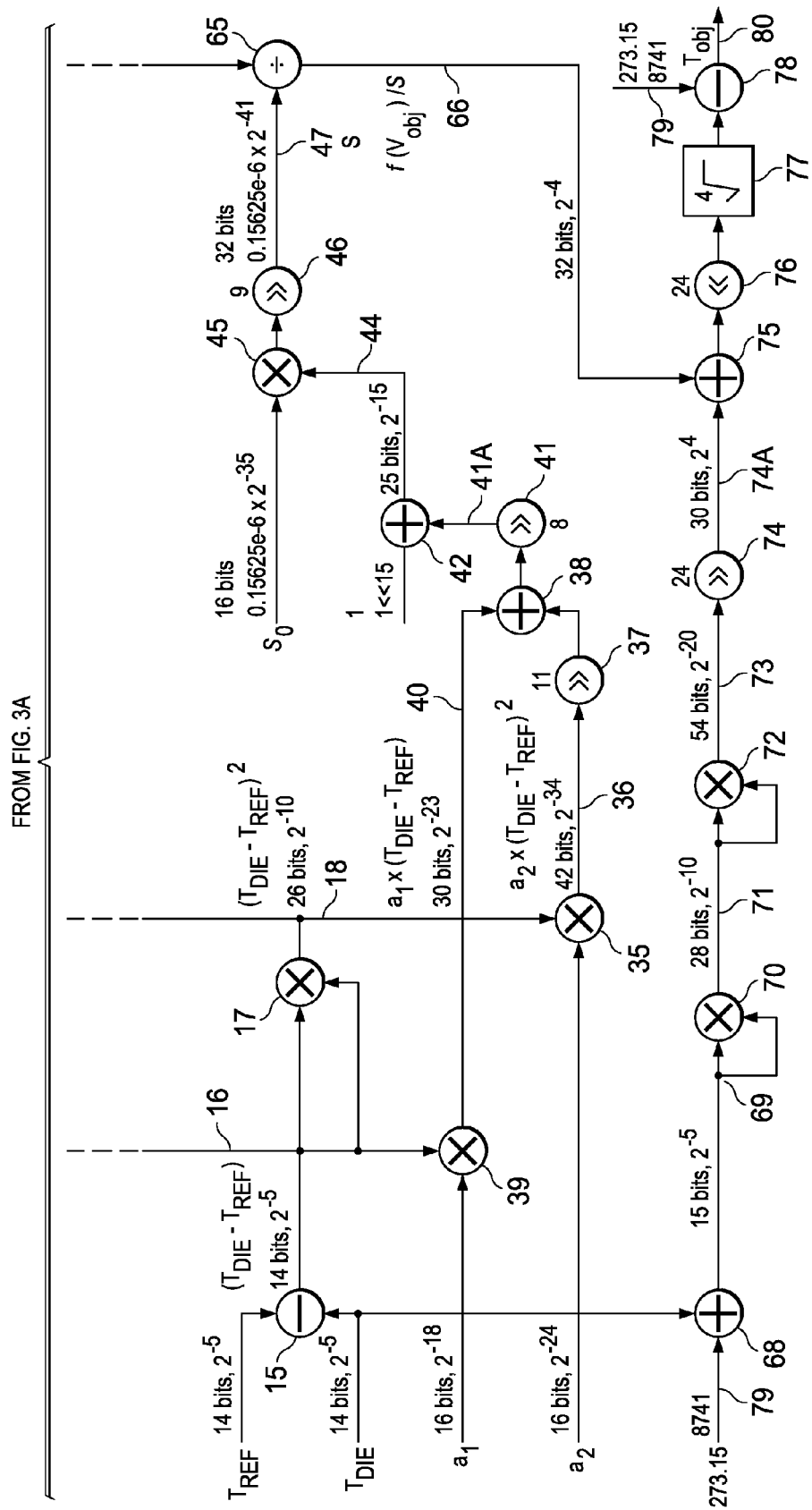

FIGS. 3A and 3B illustrate a flow diagram that shows both the operation and logic circuitry structure of a modified fixed point conversion algorithm 100 for solving the Equations 1-4 as algorithm 100 is executed by microcontroller 7 of FIG. 2, without requiring any additional logic circuitry or software for storing and adjusting exponents of 32-bit binary coded decimal numbers expressed in scientific notation as they are being processed according to the conversion algorithm 100. (In "scientific notation", as the term is used herein, a number is expressed as a real number or "mantissa" multiplied by a base number (which may be 10 or 2) raised to a power that is referred to as the "exponent".) The various inputs to the algorithm 100 include the coefficients and variables $c_2$, $V_{obj}$, $b_0$, $b_2$, $b_1$, $R_{REF}$, $T_{DIE}$, $a_1$, $a_2$, so most of these constants and variables appear along the left edge of FIG. 2 as inputs to the conversion algorithm 100. Various add, subtract, multiply, divide, and bit shifting logic operators in the flow diagram of FIGS. 3A and 3B are represented by a circle around an indicia, including +, −, ×, and ÷ signs and >> (shift right) and << (shift left) signs that indicate the type of operation performed by the logic operator. The logic operators are connected by lines referred to as "paths".

In FIGS. 3A and 3B, the number of bits for each constant and variable is indicated adjacent to each path. The value of the "significant bits" (mantissa) and the "resolution" (exponent) of each constant and variable also is shown. For example, the value of the constant $b_0$ includes 16 bits expressed with a resolution or LSB (least significant bit) of 0.15625e-6. (In computer programming and in all scientific representation of numbers in computers, the term "e-6" is the same as the term "×10$^{-6}$"). The significant bits have a value 0.15625 multiplied by "e-6", which means $10^{-6}$. For example, if the reading of a 32-bit register containing $b_0$ is equal to 3, the actual value of $b_0$ would be 3×0.1562 e-6 (where e=10).

For the subsequently described example, the values of $a_1$, $a_2$, $b_0$, $b_1$, $c_2$, $S_0$, and $T_{REF}$ for Equations 1-4 are $a_1$=−1.75×$10^{-5}$, $a_2$=−1.678×$10^{-5}$, $b_0$=−3.0×$10^{-5}$, $b_1$=−6.0×$10^{-7}$, $b_2$=0.25×$10^{-9}$, $c_2$=13.4, $S_0$=6.8×$10^{-14}$, and $T_{REF}$=298.15 degrees Kelvin.

In Equations 1 and 2, note that expression $(T_{DIE}-T_{REF})$ appears more than once, and the expression $(T_{DIE}-T_{REF})^2$ also appears more than once. Therefore, it is convenient in the flow diagram of FIGS. 3A and 3B to initially generate the expression $(T_{DIE}-T_{REF})$. To accomplish this, it is necessary to first obtain the value of $b_2$, $T_{DIE}$ and $T_{REF}$ both are represented by 14 bit integers. Both have a resolution (i.e., the "value" of 1 LSB) of $2^{-5}$, which is equal to 0.03125. Whenever two numbers expressed in scientific notation are to be added or subtracted, the decimal point or binary point (i.e., the resolution) must be the same for both numbers. Before the two numbers are added or subtracted, the decimal point or binary point must be shifted so as to make their exponents (i.e., their resolutions) equal.

In this example, $T_{DIE}$ and $T_{REF}$ have the same resolution of $2^{-5}$ and therefore can be immediately subtracted by subtraction operator 15, to produce the 14 bit number $(T_{DIE}-T_{REF})$ with resolution $2^{-5}$ on path 16. That value is multiplied by itself by multiplication operator 17 to produce the 26 bit number $(T_{DIE}-T_{REF})^2$ on path 18. (The reason it is a 26 bit number rather than a 14+14=28 bit number is that it is already known that the two 14 bit numbers are of the same sign and that their product will be positive. Thus, the sign bit from each multiplicand can be eliminated, resulting in 13+13=26 bits. The binary exponents of −5 for each of $T_{DIE}$ and $T_{REF}$ are added to provide a binary exponent of −10 or $2^{-10}$ as the resolution of the value of $(T_{DIE}-T_{REF})^2$ on path 18.) The numbers generated on paths 16 and 18 can be used to provide the terms $(T_{DIE}-T_{REF})$ and $(T_{DIE}-T_{REF})^2$, respectively, in each of Equations 1 and 2.

In Equation 2 for $V_{OS}$, $b_1$ is multiplied by $(T_{DIE}-T_{REF})$ to generate the 31 bit number $_{B1}\times(T_{DIE}-T_{REF})\times2^{-13}$ on path 24, as indicated by operator 23. Also, $b_2$ is multiplied by $(T_{DIE}-T_{REF})_2$ on path 18, as indicated by operator 20, and then is shifted 11 bits to the right by operator 21 (which equalizes the resolution of the numbers on paths 22 and 24 by discarding the lower 11 bits of the output of multiplication operator 20), to generate the number $_{B2}\times(T_{DIE}-T_{REF})^2\times2^{-13}$ on path 22. Then the number $_{B1}\times(T_{DIE}-T_{REF})\times2^{-13}$ on path 24 and the number $_{B2}\times(T_{DIE}-T_{REF})^2\times2^{-13}$ on path 22 are added by operator 25 and then shifted one bit to the right by operator 26 to produce a number on path 27. The number on path 27 has the same resolution of $2^{-12}$ as $b_0$ on path 32 after it has been shifted 12 bits to the left by operator 28. Therefore, the numbers on paths 29 and 32 can be added by operator 29 and then shifted one bit to the right by operator 30 to generate the value $V_{OS}$ of Equation 2 on path 31.

At this point, it should be noted that if two binary numbers are multiplied, resulting in a binary number having more than 32 bits of significance, then additional 32 bit registers would be needed. Furthermore, the more significant bits that need to be temporarily stored, the more registers would be needed to execute the algorithm. For example, if multiplication of two numbers results in a 64 bit product, a sufficient number of bits at any point in the algorithm needs to be discarded so that the multiplication product fits into a single 32 bit register for the next operation on that product.

Regarding Equation 1, $a_1$ is multiplied by $(T_{DIE}-T_{REF})$. To accomplish this, $(T_{DIE}-T_{REF})$ on path 16 and $a_1$ are multiplied by operator 39 to produce the number $a_1\times(T_{DIE}-T_{REF})$ on path 40 as a 32-bit number having a resolution with a binary exponent of −18−5=−23. Similarly, $a_2$ is multiplied by the already-generated number $(T_{DIE}-T_{REF})^2$ on path 18 by means of operator 35 to produce the number $a_2 \times (T_{DIE}-T_{REF})^2$ as a 42 bit number having a resolution with a binary exponent of $-10-24=-34$ on path 36. Since in this example the algorithm of FIG. 2 only has 32-bit registers available to it, it is necessary to shift this 42 bit number so as to discard a sufficient number of bits that when the shifted number is added to another likely number, e.g., a carry bit, the largest resulting sum will be a 32-bit number. Therefore, the 42 bit number $a_2 \times (T_{DIE}-T_{REF})^2$ is shifted to the right by 11 bits by means of shift operator 37, resulting in a 31 bit number having a resolution with a binary exponent of $+11-34=-23$.

Then the number $a_1 \times (T_{DIE}-T_{REF})$ on path 40 and the number $a_2 \times (T_{DIE}-T_{REF})^2$ on path 36 are added by operator 38 to produce a sum having a resolution with a binary exponent $-23$, which is shifted 8 bits to the right by operator 41 to produce a resolution with a binary exponent of $-23+8=-15$ on path 41A. The number on path 41A needs to be added by means of operator 42 to the number 1 in order to provide the quantity "$S_0 \times 1$" that appears in Equation 1. Therefore, the number 1 needs to be shifted 15 bits to the left, as indicated by "1<15", so its resolution matches that of the number on path 41A. The multiplication by operator 45 results in a representation of S which needs to be shifted 9 bits to the right by operator 46 in order to provide a 32-bit number having a resolution with a binary exponent of $-15-35+9=-41$ on path 47. The resulting representation of the value of S in Equation 1 is used for the division operation in Equation 4, which is performed in the algorithm of FIGS. 3A and 3B by a suitable division operator 65.

Equation 3 is utilized to compute $f(V_{obj})$, which then is utilized in Equation 4. The value of $(V_{obj}-V_{OS})$ is determined first. Operator 48 shifts $V_{obj}$, which is a 16 bit integer of resolution 0.15625e-6, 11 bits to the left so $V_{OS}$ on path 31 can be subtracted from $V_{obj}$. The subtraction is performed by operator 50 to generate $(V_{obj}-V_{OS})$ as a 32-bit number of resolution $0.15625\text{e-}6 \times 2^{-11}$ on path 51. $(V_{obj}-V_{OS})$ on path 51 is multiplied by itself by means of operator 52 to generate $(V_{obj}-V_{OS})^2$ as a 62-bit number of resolution $0.15625\text{e-}6 \times 2^{-22}$ on path 53. That number is shifted 31 bits to the right to discard unnecessary bits, and only the 31 most significant bits are kept. The resulting representation of $(V_{obj}-V_{OS})^2$ is multiplied by $c_2$ by means of operator 55 and then is shifted 12 bits to the right by operator 58 in order to keep the value of $c_2 \times (V_{obj}-V_{OS})^2$ in a 31 bit format. Also, the original value of $(V_{obj}-V_{OS})$ on path 51 is shifted 5 bits to the right by operator 51A to provide $(V_{obj}-V_{OS})$ on path 51B as a 27 bit number of resolution $2^{-6}$. Then the values of $(V_{obj}-V_{OS})$ on path 51B and $c_2 \times (V_{obj}-V_{OS})^2$ on path 58A are added by operator 60 to generate $f(V_{obj})$ as a 32-bit number of resolution $2^{-6}$ on path 61. That value is shifted 31 bits to the left by operator 62 to produce $f(V_{obj})$ as a 63 bit number of resolution $2^{-37}$ on path 63. This format is suitable to allow division of $f(V_{obj})$ by S, as subsequently described, wherein 32-bit accuracy is desired for the desired result $f(V_{obj})/S$ used in Equation 4. The value of $f(V_{obj})$ on path 63 is stored in a 32-bit register.

The die temperature $T_{DIE}$ needs to be converted from degrees centigrade to degrees Kelvin. To convert the dimension of $T_{DIE}$ from degrees centigrade to degrees Kelvin, it is necessary to add 273.15 to $T_{DIE}$. That value, expressed as a binary coded decimal with a resolution of $-5$, is 8741 on path 79, is added by means of operator 68 to $T_{DIE}$ expressed as a 14 bit number with a resolution of $2^{-5}$. The result on path 69 is squared (i.e., multiplied by itself) by means of operator 70, and that result is squared again by operator 72 to provide $T_{DIE}^2$ as a 54 bit number with a resolution of $2^{-29}$ on path 73.

The number on path 73 is shifted 24 bits to the left to discard unnecessary bits and provide a 32-bit number with a resolution of $+4$ on path 74A. The number generated on path 74A is added by operator 75 to the 32 bit value of $f(V_{obj})/S$ produced on path 66 with a resolution of $2^4$. The number produced by operator 75 then is shifted 24 bits to the left, because the next operation will be a fourth root operation obtained by means of a subsequently described binary search function indicated in block 77. The result of the fourth root operation 77 is converted from degrees Kelvin to degrees centigrade by subtracting the value 8741 on path 79 (which represents 273.15 degrees) by means of operator 78 to obtain the value of $T_{obj}$ on path 80, which accurately represents the temperature of the surface of remote object 2 in FIG. 2.

When it is known which mathematical operations are to be performed by an algorithm designed to solve a particular equation or set of equations and when the values of the associated constants and the ranges of values of the variables are also known, then the values of the exponents that need to be associated with the various 32-bit numbers (expressed in scientific notation) involved in performing the algorithm can be determined in advance. The algorithm can be designed so that the 32-bit numbers expressed in scientific notation can be thought of as having "virtual exponents" so that it is not necessary for the algorithm to keep track of the already-known exponents. Instead, the values of the already-known "virtual exponents" can be properly maintained at predetermined values by automatically applying the needed amounts of shifting of the significant bits of digital words involved in executing the algorithm. Therefore, it is not necessary for the software algorithm 100 to move decimal points and correspondingly adjust exponents of the 32-bit binary-coded digital numbers involved in executing the algorithm 100. The shifting prevents any binary number from requiring a register larger than 32 bits.

In the algorithm of FIGS. 3A and 3B, the temperatures are defined as 16 bit integers, so the temperature numbers raised to the fourth power as in Equation 4 may be stored as a 64 bit integer. Starting with a 64 bit number, a 4th order square root will provide the required 16 bits of accuracy for the temperature. The basic procedure for estimating the fourth root operation required in Equation 4 includes using a binary search function for a 16-bit number. It is a straight forward matter to calculate the power of 4 of a value. This can be accomplished easily by twice multiplying the value by itself. Unfortunately, the same cannot be said for the inverse function or the fourth order square root of an input value. Therefore, the binary search function basically "guesses" an answer and then calculates its power of four and compares that to the input. Based on that comparison, the binary search function adjusts its guess until it matches the input value. The "guess" by the binary search function includes starting from bit 16 and assuming it is a "1" and calculating the power of four of the 16-bit number by squaring the number twice. If the power of 4 of the number is larger than the input value, bit 16 should be kept as a "1", but otherwise it should be set to "0". This process is repeated for each of bits 15 through 1.

The described conversion algorithm 100 is a modified version of a fixed point implementation. The decimal point is separately adjusted for each main step in the execution of conversion algorithm 100, and this is accomplished by shifting the decimal point left or right between successive steps. The decimal point is adjusted right or left to predetermined locations between successive steps in order to maintain accuracy and avoid overflow (since the number of bits in each binary number is limited to 32 bits in this example. The pre-determined decimal point locations are known because the ranges of the inputs and the ranges of the various coefficients in the equations are limited, and this allows the decimal point locations to be predetermined for the various shift operators. Consequently, there is no need to keep track of the decimal point or to use a number representing its location to calculate the next appropriate decimal point location.

The output $T_{obj}$ of the algorithm of FIGS. 3A and 3B may be filtered using a first order digital filter to reduce output noise, and another first order digital filter may be used to calculate the slope of $T_{DIE}$ to allow transient correction of $T_{obj}$. Basically, the sensor experiences voltage offsets and errors during a rapid temperature change (i.e. experiences a "temperature transient") of the IR sensor integrated circuit. A temperature transient correction algorithm (not described herein) may be provided to temperature transient errors by using the slope of $T_{DIE}$ and adding it back into the IR sensor output voltage $V_{obj}$.

Both of the previously mentioned first order digital filters may be implemented according to the conventional equation $$x_{Filtered}[n] = a \times (x[n] + x[n-1]) + b \times (x_{Filtered}[n-1]) \quad \text{Eqn. (5)}$$

where $2a+b=1$, and where a and b are coefficients that relate to the pole of the filter as shown in Equation 6 below. (What this means is that any noise signal that is changing at a rate faster than the frequency of the pole will be reduced. The integer "n" is to the "digital world" what time is to the analog world. In the digital world, events occur at discrete points in time. For example, if x[n] is the present value of x, then x[n−1] is the previous value of x and x[n−2] is the value of x two cycles ago.)

The pole of filter Equation 5 in (Hz) can be calculated according to $$FilterPole(Hz) = \left(\frac{2a}{1-a}\right)\left(\frac{1}{SamplingTime}\right). \quad \text{Eqn. (6)}$$

Unlike the prior art IR-to-object-temperature conversion algorithms, the "virtual resolution" property of the algorithm 100 of FIGS. 3A and 3B includes use of bit shifting operations that establish the predetermined needed resolution of every binary number so that if it will fit in a 32-bit register at any point in algorithm 100 (except in the numerator of the division performed by the above-mentioned binary search function indicated by divide operator 65.

The exponents that represent the virtual resolution actually are "virtual exponents" in the sense that they never appear as actual numbers anywhere in the conversion algorithm 100 of FIGS. 3A and 3B or in the microcontroller 7 in FIG. 2. That avoids the need to utilize a large amount of integrated circuit chip area, a large number of instructions, and/or a large amount of memory in microcontroller 7 and/or associated with the execution of the algorithm 100.

In algorithm 100 of FIGS. 3A and 3B, the software shifting of bits of the various numbers as they are processed through the algorithm is "built-in" such that the total width of the binary numbers never exceeds 32 bits, so the register utilized for the next operation is not required to be larger than 32 bits. (The exception is in a division operation, because division by a small number could result in a large result. Simple appropriate checks (not described) are built into the conversion algorithm 100 to prevent this from happening.) Algorithm 100 of FIGS. 3A and 3B disregards a sufficient number of bits so that every number always fits within a 32-bit register. In a described implementation of conversion algorithm 100, only four 32-bit registers are utilized by microcontroller 7 to accomplish all of the mathematics of the software algorithm of FIGS. 3A and 3B. This avoids the need for software or hardware which keeps track of exponents and modifies them as needed, and also avoids the need for registers larger than 32 bits, and therefore reduces the amount of integrated circuit chip area required and substantially reduces overall costs of a contactless IR-based remote object temperature measurement device.

As previously indicated, the resolutions of numbers must match when before they are added or subtracted. For example, if the number "x" has a resolution of 0.15625e-6 and "y" has a resolution of $2^{-5}$, assume it is necessary to compute the expression "x+(a×y)", and also assume "a" can have any desired resolution and the resolution of "a" is chosen to be "1". Since the resolutions of x and y are very different they can not be directly added to perform the above computation. It is necessary to choose the "a" coefficient to have a resolution of $0.15625e-6 \times 2^{-5}$. When "a" is multiplied by y, the resolutions are also multiplied (i.e., the corresponding exponents are algebraically added) and the result of the multiplication by y has a resolution of $0.15625e-6 \times 2^{-5} \times 2^{-5} = 0.15625e-6$, which is the same as the resolution of an x. Therefore, the computation "x+(a×y)" can be properly performed.

As a comparison of different ways of "implementing" conversion algorithm 100, both the virtual resolution software algorithm of FIG. 3 and a floating-point-emulation-implemented version of the same basic algorithm were compiled, using an ARM C++ compiler, into an M0 microprocessor produced by the ARM Holdings company. (ARM is a company that provides other companies with various microcontroller architectures which can be embedded into their own designs. For example, if a company wants to embed a microcontroller into a particular product, the ARM company can just use its M0 microcontroller design (which is one of the simplest microcontroller designs that ARM offers) in that product. A significant problem is that various companies uses different integrated circuit manufacturing processes to fabricate their integrated circuits, so any particular integrated circuit design may need to be modified according to the integrated circuit manufacturing processes of the foundry or foundries that will be actually manufacturing the product. In this example, the ARM M0 microcontroller must be recompiled in accordance with the one or more integrated manufacturing processes that will be used to manufacture the product.

The above mentioned comparison showed that the floating point emulation code size was 2500 bytes, whereas the virtual resolution code size of algorithm 100 was much smaller, only 600 bytes. With a clock speed of 150 Hz, the floating point emulation required 96 milliseconds to execute, whereas the virtual resolution algorithm 100 of FIGS. 3A and 3B was approximately 5 times faster, requiring only 19 milliseconds to execute. Furthermore, the virtual resolution conversion algorithm of FIGS. 3A and 3B executed by means of microcontroller circuitry optimized to solve only Equations 1-4 required only approximately one fourth of the amount of integrated circuit chip area required by a conventional fixed-point hardware implementation of an algorithm for solving Equations 1-4. Although the accuracy provided by the virtual resolution conversion algorithm provided somewhat lower accuracy, that accuracy nevertheless is adequate for most applications.

Figure 4:
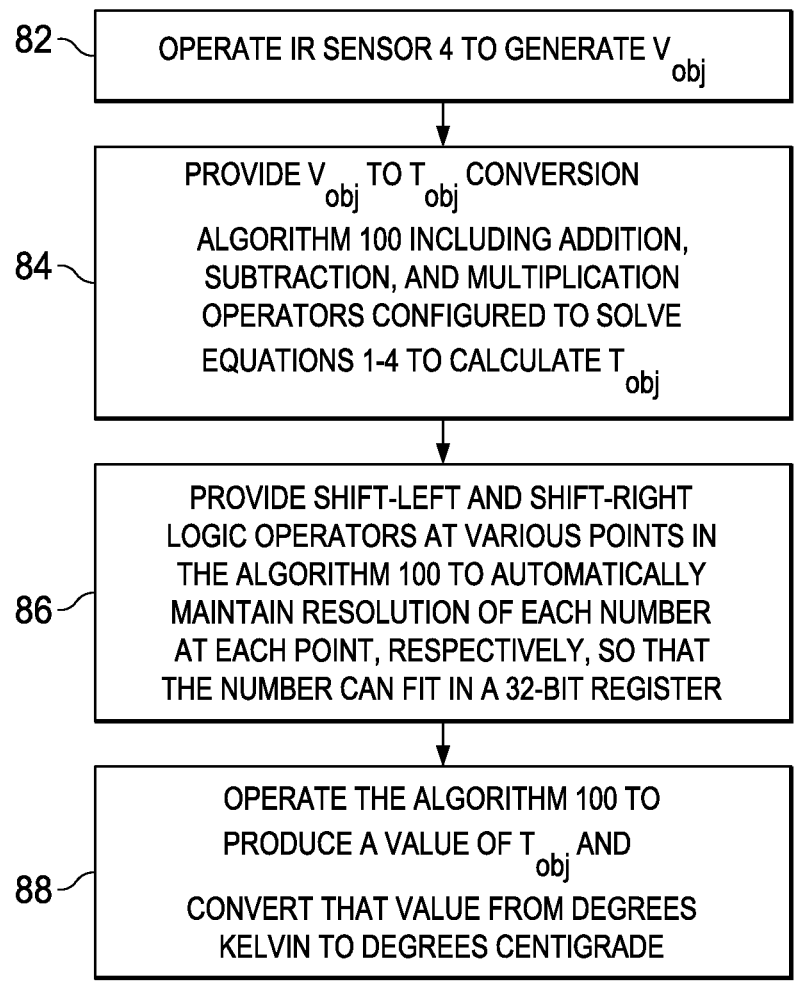
FIG. 4 is a generalized flowchart of the conversion algorithm shown in the flow diagram of FIGS. 3A and 3B.
Figure 5B:
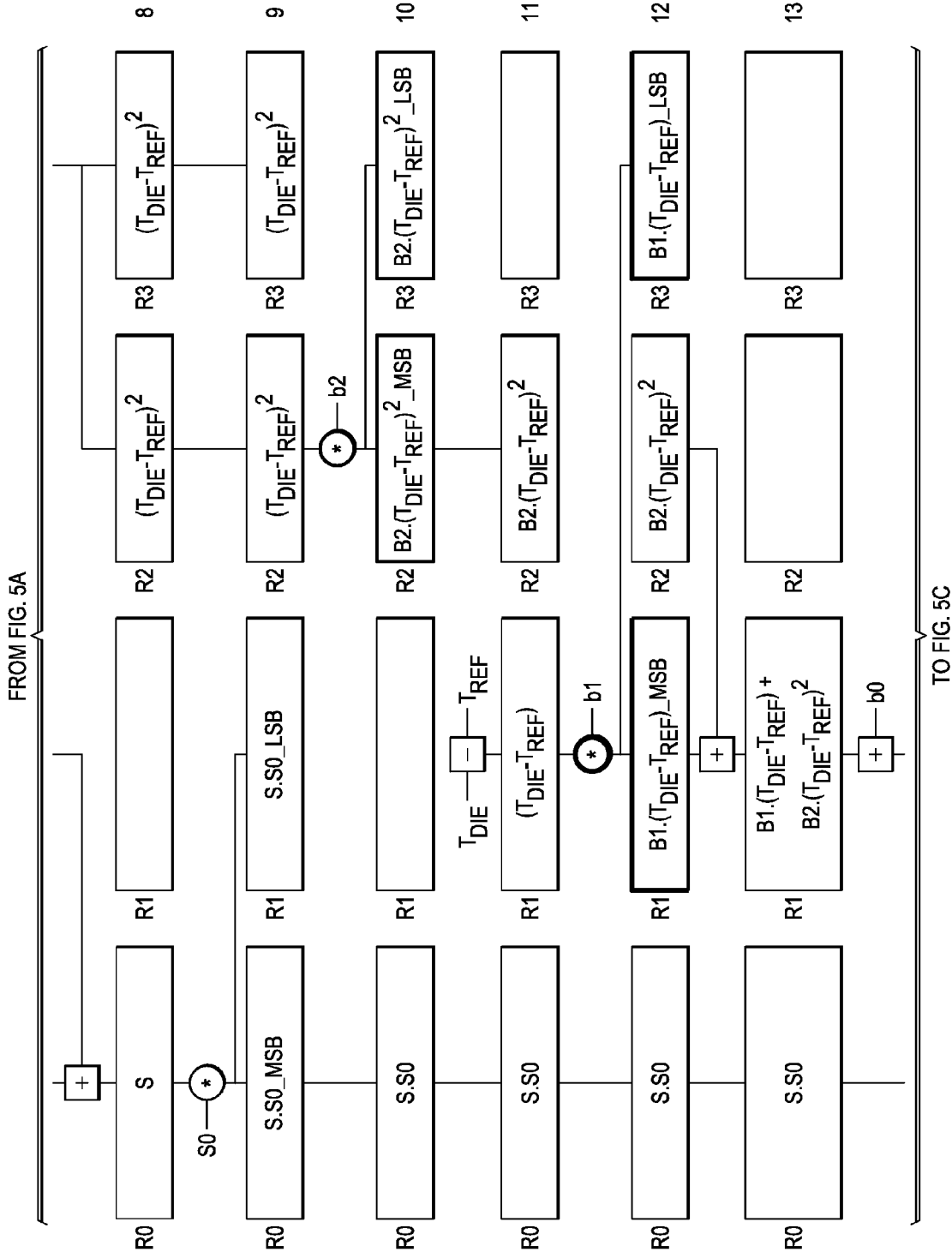
Figure 5C:
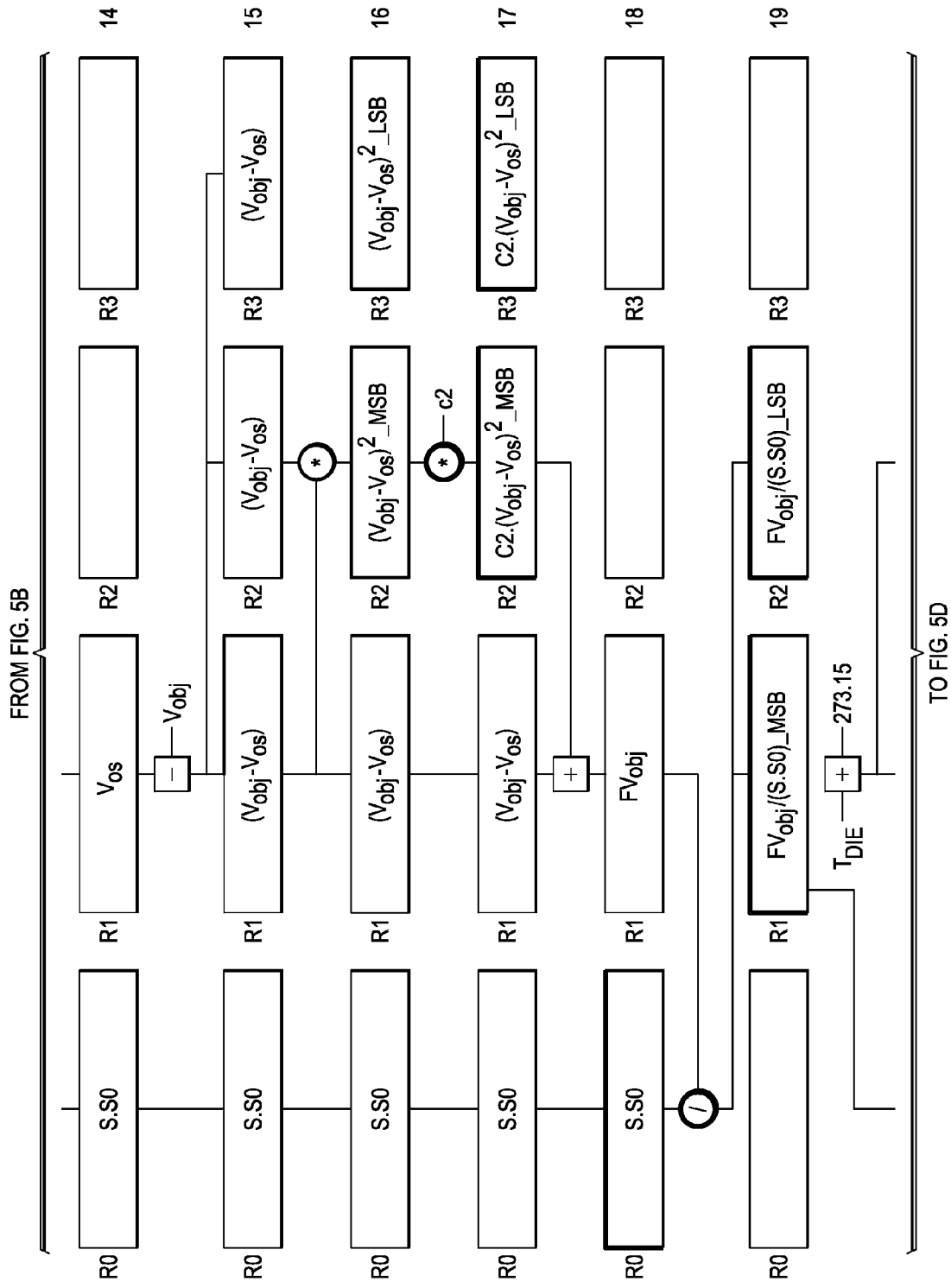
Figure 5D:
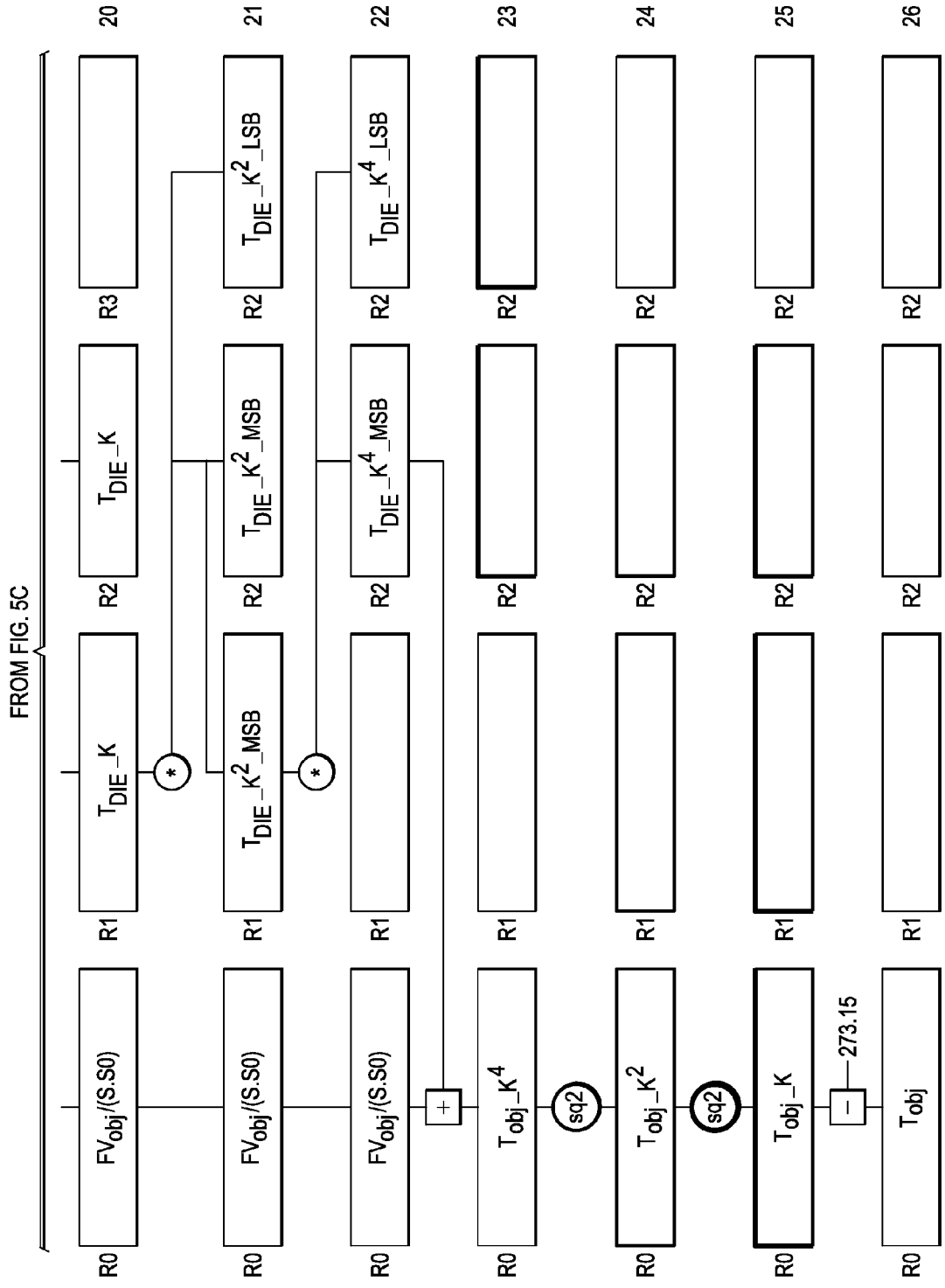

FIG. 4 shows a generalized flowchart indicating the methodology of the conversion algorithm 100 shown in FIGS. 3A and 3B. In FIG. 4, the first step in the method, as indicated in block 82, is to provide and operate IR sensor 4 in FIG. 2 to generate a digital number $V_{obj}$ in response to IR radiation emitted by remote object 2 having a temperature $T_{obj}$ and impinging on IR sensor 4. The next step, as indicated in block 84, is to provide and operate conversion algorithm 100, including addition operators, subtraction operators, multiplication operators, and division operators especially configured so as to solve Equations 1-4 to generate a digital number that accurately represents $T_{obj}$, in response to $V_{obj}$, $T_{DIE}$, and the various parameters of an integrated circuit 1-1 on which the IR sensor 4, and providing microcontroller 7 optimized for execution of conversion algorithm 100.

As indicated in block 86, the method includes providing the various shift-left operators and various operators arranged at various points in algorithm 100 so as to automatically maintain the predetermined resolution or exponent of each number (expressed in scientific notation) at each point, respectively, being processed in conversion algorithm 100 so that number has a sufficiently small bit length to ensure that the entire number can fit into a 32-bit register. Then, as indicated in block 88, the solution to Equation 4 generated by conversion algorithm 100 is converted from degrees Kelvin degrees centigrade.

Conversion algorithm 100 of FIGS. 3A and 3B can be executed by microcontroller 7 using only four 32-bit registers, as shown in FIGS. 5A, 5B, 5C, and 5D. FIGS. 5A, 5B, 5C, and 5D show the program flow from a memory point of view, and shows that the maximum number of registers needed at any one point during execution of the algorithm 100 is only four registers. Note that the flow shown in N is simplified and does not expressly include the automatic bit shifting, needed for the various addition and subtraction operations, as that information is provided in conversion algorithm 100 as shown in FIGS. 3A and 3B. Referring to FIGS. 5A, 5B, 5C, and 5D, all four registers R0, R1, R2, and R3 are initialized to zero. During step 1, $T_{DIE}-T_{REF}$ is calculated and a copy of that result is also stored in all four registers R0, R1, R2, and R3. In step 2, $T_{DIE}-T_{REF}$ in register R0 is multiplied by the coefficient a1, and the result $a1(T_{DIE}-T_{REF})$ is stored in registers R0 and R1. With appropriate bit shifting, the result is reduced to fit within one register R0. Note that in general, during a multiplication the number of bits of the result may be larger than 32, up to a maximum of 64. The output of the multiplier is always sent to two registers and during the next steps the appropriate number of bits are shifted out, i.e. discarded, to keep the number of hits stored for the rest of the algorithm within the 32 bit limit.

In step 3, the LSB hits register R1 of the previous step 3 operation are discarded and instead replaced with $T_{DIE}-T_{REF}$ again, which is accomplished by copying the value from register R2. In step 4, the values of registers R1 and R3 are multiplied, resulting in the value of $(T_{DIE}-T_{REF})^2$ which is stored in registers R1 and R2. With the predetermined appropriate shifting, only the MSB bits are kept in register R1 and that value is also copied over to register R3 to be used in a different part of the equation later. In step 5, the coefficient a2 is multiplied by register R1 to generate $a2(T_{DIE}-T_{REF})^2$ and the result is stored in registers R1 and R2. Again, appropriate predetermined automatic bit shifting reduces the results to fit in register R1 only. In step 6 the values in registers R1 and R0 are added to generate $[a1(T_{DIE}-T_{REF})+a2(T_{DIE}-T_{REF})^2]$ which is stored in registers R0 and R1 and then shifted to fit in register R0. In step 7, register R1 is initialized with the value of 1 and then added to register R0 to generate $[1+a1(T_{DIE}-T_{REF})+a2(T_{DIE}-T_{REF})^2]$. The value is again stored in register R0. In step 8, the value in R0 is multiplied by the coefficient $S_0$ to generate the value of $S_0[1+a1(T_{DIE}-T_{REF})+a2(T_{DIE}-T_{REF})^2]$, which is equal to S as defined in Equation (1) above. Similarly. FIGS. 5A, 5B, 5C, and 5D further show how the rest of the equations can be calculated afterwards in steps 9 to 26.

To summarize, the described software algorithm, without additional software or hardware to keep track of resolution or exponents, automatically maintains the resolution of numbers being processed at every stage such that all numbers always can fit within a 32-bit register. When multiplying two 32 bit (or lower number of bits), the result will be at most a 64 bit value. If necessary, the value of each number being processed is automatically shifted by an appropriate predetermined number of bits so that their product will include no more than 32 bits to be presented for the next operation. In this way, the largest binary number generated in conversion algorithm 100 in this example is a 64 bit integer, and that number would be for a division operation. (in the case of a division operation, division by zero or a small number would result in a very large number, so conventional "checks" are provided in the code to ensure that the divided result can fit within a 32-bit register.)

One advantage of the described modified fixed point implementation of the algorithm for converting infrared radiation to the temperature of the imaging object is that a smaller amount of memory is required than is the case for a floating point emulation technique. Using the software bit shifter operators in conversion algorithm 100 to maintain resolution of various numbers automatically without keeping track of resolution and exponents so that the numbers can always fit in 32-bit registers and the implementation using only the four registers shown in FIGS. 5A, 5B, 5C, and 5D allows both the microcontroller hardware aspects and the amount of memory required to store algorithm 100 of the execution of algorithm 100 to solve of Equations 1-4 to fit in a very small amount of integrated circuit chip area. Furthermore, the described modified fixed point implementation of the conversion algorithm 100 results in much faster execution thereof. The $V_{obj}$-to-$T_{obj}$ conversion algorithm 100 thus improves the conversion speed, reduces integrated circuit memory requirements and reduces power consumption, and therefore may be very beneficial to a user, especially if a floating point implementation is not available to the microcontroller being utilized. In contrast, competitive IR sensors use a full microcontroller implementation including many more registers and requiring much more memory for storing the programming code. Consequently, the competitive integrated circuit IR sensors are substantially larger and consume substantially more power than the IR sensor system described herein.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention. The configuration of the basic conversion algorithm could be provided in various ways other than precisely as shown in the flow diagram of FIG. 3. The conversion algorithm also could be utilized to solve Equations 1-4 in applications other than the one described herein.

What is claimed is:

1. A system comprising:
an integrated circuit chip; comprising:
a microcontroller; and
a memory coupled to the microcontroller, and storing program code that, when executed by the microcontroller, causes the microcontroller to:
perform a plurality of addition operations, a plurality of subtraction operations, a plurality of multiplication operations, a plurality of shift-left operations, and a plurality of shift-right operations, the plurality of addition, subtraction, multiplication, shift-left and shift-right operations being configured so as to solve a particular group of equations,
solve the particular group of equations for a plurality of input numbers, each of the input numbers having a value within a predetermined range associated with the respective input number, and
perform the shift-left and shift-right operations for the input numbers so as to automatically establish a resolution of each of a plurality of one or more generated numbers that are generated by one or more of the addition, subtraction, multiplication, shift-left and shift-right operations such that the respective generated number fits within a register of a predetermined number of bits.

2. The system of claim 1, wherein the system is configured to convert infrared (IR) radiation emitted by a remote object to a value representative of a temperature of the remote object, the system further comprising:
an IR sensor receiving some of the emitted IR radiation for producing a voltage representing the temperature of the remote object,
wherein the program code further causes the microcontroller to convert the voltage into a value representing the temperature of the remote object.

3. The system of claim 2 wherein the particular group of equations includes:

$$S = S_0(1 + a_1(T_{DIE} - T_{REF}) + a2(T_{DIE} - T_{REF})^2), \quad \text{Equation (1)}$$

$$V_{OS} = b_0 + b_1(T_{DIE} - T_{REF}) + b_2(T_{DIE} - T_{REF})^2, \quad \text{Equation (2)}$$

$$f(V_{obj}) = (V_{obj} - V_{OS}) + c_2(V_{obj} - V_{OS})^2, \text{ and} \quad \text{Equation (3)}$$

$$T_{obj}^4 = \sqrt{T_{die}^4 + \left(\frac{f(V_{obj})}{S}\right)}, \quad \text{Equation (4)}$$

where S represents a sensor response relative to the fourth power of a temperature $T_{DIE}$ of the IR sensor, $S_0$ represents a linear portion of the sensor response, $a_1$ and $a_2$ represent first and second order dependence, respectively, on the temperature $T_{DIE}$ of the IR sensor, $T_{REF}$ represents 298.15 degrees Kelvin, $c_2$ represents a non-linearity in the sensor output compared to an ideal radiation transfer, and $V_{OS}$ represents a voltage offset of the IR sensor, where $b_0$, $b_1$, and $b_2$ represent the constant, first order and second order dependence, respectively, of the offset voltage $V_{OS}$ on the sensor temperature $T_{DIE}$, and where $V_{obj}$ represents the voltage produced by the IR sensor, and $T_{obj}$ represents the temperature of the remote object.

4. The system of claim 3 wherein the IR sensor is included in the integrated circuit chip.

5. The system of claim 3 wherein the program code further causes the microcontroller to convert the temperature $T_{DIE}$ of the integrated circuit from degrees centigrade to degrees Kelvin before determining the value of the temperature in degrees Kelvin of the remote object according to Equation (4), and to convert the temperature in degrees Kelvin of the remote object according to Equation (4) to degrees centigrade to produce the temperature of the remote object in degrees centigrade.

6. The system of claim 3 wherein the program code further causes the microcontroller to perform a fourth order square root function for Equation (4) by performing a binary search to generate a number representing $f(V_{obj})/S$.

7. The system of claim 3 wherein the values of $a_1$, $a_2$, $b_0$, $b_1$, $b_2$ $c_2$, $S_0$, and $T_{REF}$ for Equations 1-4 are $a_1 = -1.75 \times 10^{-5}$, $a_2 = -1.678 \times 10^{-5}$, $b_0 = -3.0 \times 10^{-5}$, $_{B1} = -6.0 \times 10^{-7}$, $_{B2} = 0.25 \times 10^{-9}$, $c_2 = 13.4$, $S_0 = 6.8 \times 10^{-14}$, and $T_{REF} = 298.15$ degrees Kelvin.

8. The system of claim 7 wherein the program code is executed by the microcontroller using only four 32-bit registers.

9. The system of claim 1 wherein the predetermined number of register bits is 32 bits.

10. The system of claim 1 wherein some of the generated numbers are expressed in scientific notation and others are expressed only as binary numbers.

11. The system of claim 1 wherein the program code further causes the microcontroller to implement a digital filter defined in accordance with the expression $$x_{Filtered}[n] = a \times (x[n] + x[n-1]) + b \times (x_{Filtered}[n-1])$$

where $2a + b = 1$, for reducing output noise of the temperature of the remote object, and where a and b are coefficients that relate to a pole of the digital filter, and where n is an integer that represents a point in time.

12. The system of claim 1 wherein the program code further causes the microcontroller to implement a digital filter defined in accordance with the expression $$x_{Filtered}[n] = a \times (x[n] + x[n-1]) + b \times (x_{Filtered}[n-1])$$

where $2a + b = 1$, for use in transient correction of the temperature of the remote object, and where a and b are coefficients that relate to a pole of the digital filter, and where n is an integer that represents a point in time.

13. The system of claim 1 wherein the program code further causes the microcontroller to perform the shift-left and shift-right operations to automatically establish the resolutions without keeping track of decimal points or associated resolutions or exponents of numbers.

14. A method of operating a system including an integrated circuit chip that includes a microcontroller, the method comprising:
performing, with the microcontroller, a plurality of addition operations, a plurality of subtraction operations, a plurality of multiplication operations, a plurality of shift-left operations, and a plurality of shift-right operations; and
solving a particular group of equations for a plurality of input numbers, each of the input numbers having a value within a predetermined range associated with the respective input number,
wherein performing the plurality of shift-left and shift-right operations includes performing the shift-left and shift-right operations so as to automatically establish a resolution of each of a plurality of one or more generated numbers that are generated by one or more of the addition, subtraction, multiplication, shift-left and shift-right operations to cause the respective generated number to fit within a register having a width of a predetermined number of bits without keeping track of decimal points or associated resolutions or exponents of the generated number.

15. The method of claim 14 further comprising:
receiving, with an infrared (IR) sensor, emitted IR radiation;
producing, with the IR sensor, a voltage representing a temperature of the remote object; and
converting, with the microcontroller, the voltage into a value representing the temperature of the remote object.

16. The method of claim 15 wherein the particular group of equations includes:

$$S = S_0(1 + a_1(T_{DIE} - T_{REF}) + a2(T_{DIE} - T_{REF})^2), \quad \text{Equation (1)}$$

$$V_{OS} = b_0 + b_1(T_{DIE} - T_{REF}) + b_2(T_{DIE} - T_{REF})^2, \quad \text{Equation (2)}$$

$$f(V_{obj}) = (V_{obj} - V_{OS}) + c_2(V_{obj} - V_{OS})^2, \text{ and} \quad \text{Equation (3)}$$

$$T_{obj}^4 = \sqrt{T_{die}^4 + \left(\frac{f(V_{obj})}{S}\right)}, \quad \text{Equation (4)}$$

where S represents a sensor response relative to the fourth power of a temperature $T_{DIE}$ of the IR sensor, $S_0$ represents a linear portion of the sensor response, $a_1$ and $a_2$ represent first and second order dependence, respectively, on the temperature $T_{DIE}$ of the IR sensor, $T_{REF}$ represents 298.15 degrees Kelvin, $c_2$ represents a non-linearity in the sensor output compared to an ideal radiation transfer, and $V_{OS}$ represents a voltage offset of the IR sensor, where $b_0$, and $b_1$, and $b_2$ represent the constant, first order and second order dependence, respectively, of the offset voltage $V_{OS}$ on the sensor temperature $T_{DIE}$, and where $V_{obj}$ represents the voltage produced by the IR sensor, and $T_{obj}$ represents the temperature of the remote object.

17. The method of claim 16 wherein solving the particular group of equations includes solving the particular group of equations using only four 32-bit registers in the microcontroller.

18. The method of claim 16 wherein solving the particular group of equations includes performing a fourth order square root function for Equation (4) by performing a binary search to generate a number representing $f(V_{obj})/S$.

19. The method of claim 16 further comprising operating a digital filter defined in accordance with the expression $$x_{Filtered}[n] = a \times (x[n] + x[n-1]) + b \times (x_{Filtered}[n-1])$$

for reducing output noise of $T_{obj}$, where $2a+b=1$, where a and b are coefficients that relate to a pole of the digital filter, and where n is an integer that represents a point in time.

20. A system for converting infrared (IR) radiation emitted by a remote object to a value representative of a temperature of the remote object, comprising:
an IR sensor receiving some of the emitted IR radiation for producing a voltage representing the temperature of the remote object; and
means for converting the voltage to a value representing the temperature of the remote object, wherein the means for converting includes:
means for performing a plurality of addition operations, a plurality of subtraction operations, a plurality of multiplication operations, a plurality of shift-left operations, and a plurality of shift-right operations, the plurality of addition, subtraction, multiplication, shift-left and shift-right operations being configured for solving a plurality of equations;
means for solving the plurality of equations for a plurality of input numbers, each of the input numbers having a value within a predetermined range associated with the respective input number; and
means for performing the shift-left and shift-right operations for the input numbers so as to automatically establish a resolution of each of a plurality of one or more generated numbers that are generated by one or more of the addition, subtraction, multiplication, shift-left and shift-right operations such that the respective generated number fits within a register having a width of a predetermined number of bits.

* * * * *